Patented May 22, 1928.

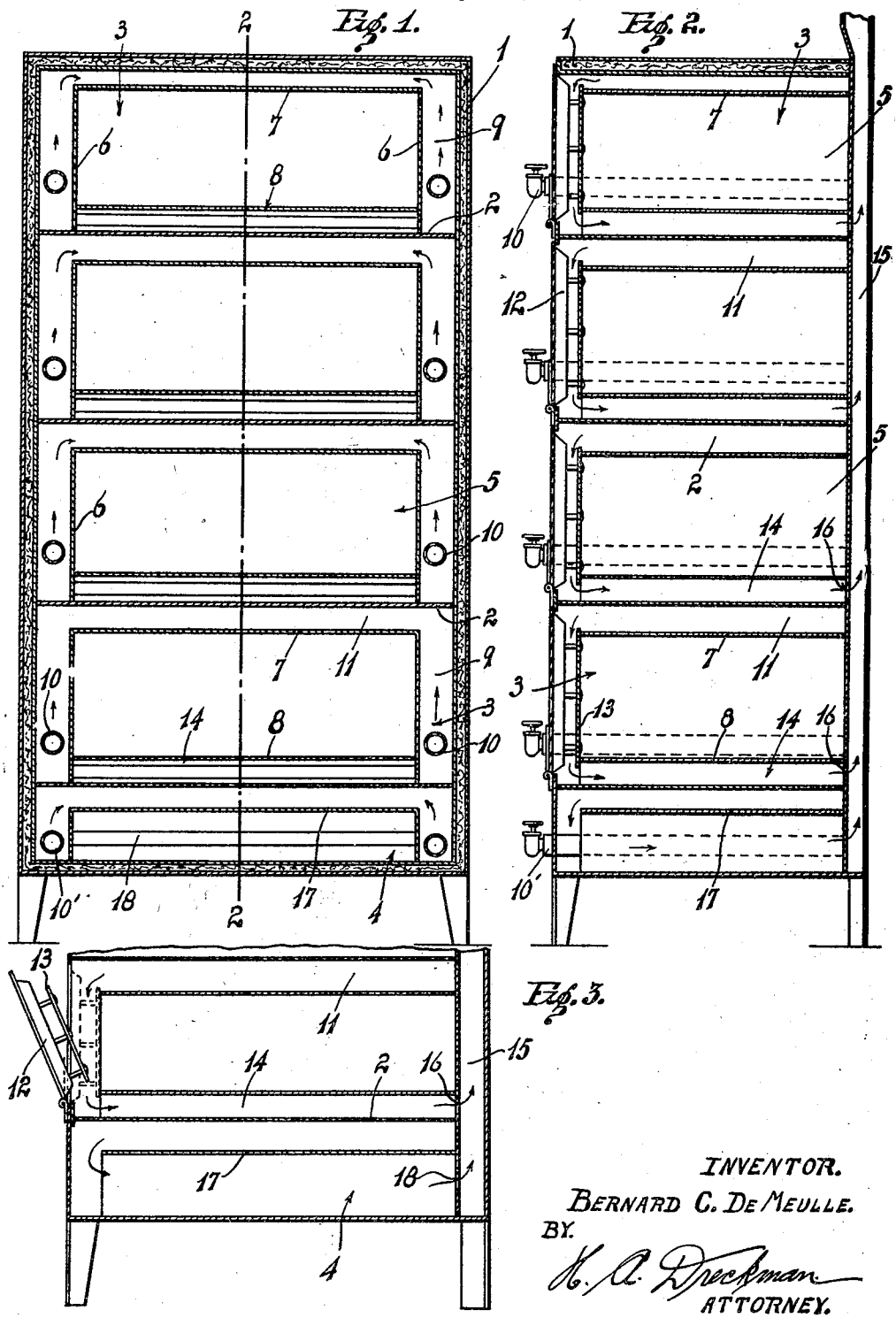

1,670,679

UNITED STATES PATENT OFFICE.

BERNARD C. DE MEULLE, OF LONG BEACH, CALIFORNIA, ASSIGNOR OF ONE-FOURTH TO ANTHONY DE MEULLE, ONE-FOURTH TO WILLIAM J. DE MEULLE, AND ONE-FOURTH TO ORVELL G. MILLER, ALL OF LONG BEACH, CALIFORNIA.

DECK OVEN.

Application filed September 22, 1926. Serial No. 136,912.

An object of my invention is to provide a deck oven in which the various ovens may be maintained at different or equal temperatures.

Another object is to provide a deck oven in which an even distribution of heat is obtained on all sides of each oven.

A further object is to provide a deck oven in which a greater percentage of the heat in the fuel is utilized for useful purposes.

A still further object is to provide a deck oven which is simple in construction and highly effective in operation.

Other objects, advantages and features of invention may appear from the accompanying drawing, the subjoined detailed description, in the appended claims or in the operation of my oven.

In the drawing:

Fig. 1 is a longitudinal sectional view of my oven.

Fig. 2 is a sectional view taken on line 2, 2 of Fig. 1.

Fig. 3 is a fragmentary longitudinal sectional view of my oven.

Referring more particularly to the drawing:

My oven comprises an outer casing or shell 1 which is suitably insulated by any well known and desirable arrangement. A plurality of transverse walls 2 are provided in the shell 1, said walls dividing the said shell into a plurality of superposed compartments 3. In the bottom of the oven and below the lowermost compartment 3 is formed a heating chamber 4, the purpose of which will be further described.

Within each of the compartments 3, I provide ovens 5, the side walls 6, top 7 and bottom 8 of which are spaced from the sides of the compartments 3. Thus a heating space 9, 9 is provided at either side of the oven 5 in which burners 10 are positioned. Thus it will be seen that each side of each oven is directly heated by a burner 10. The hot gases from these burners rise in the heating spaces 9 and pass over the top of the oven in the space 11.

A door 12 is provided for each of the compartments 3, each door being provided with a spaced plate 13 thereon, which plate bears against the oven 5 and closes the front thereof. The said plate being spaced from the door provides a passage through which the hot gases pass from the space 11 above the ovens, to the space 14 below said ovens. An outlet flue 15 is provided at the rear of my oven, and openings 16 extend from each of the spaces 14 into said flue; thereby enabling the gases to pass outwardly to the air.

To properly heat the bottom of the lowermost compartment 3, I provide a heating chamber 4 in which a baffle plate 17 is positioned. The heated gases from the burners 10' in the heating chamber 4 rise over the baffle plate 17, thus heating the bottom of the lowermost oven 5. The products of combustion then pass under the baffle plate 17 and pass out of the exhaust ports 18 into the flue 15.

It will be evident from the foregoing construction that each of the superposed ovens 5 can be maintained either at the same or different temperatures by reason of the fact that each oven has its individual burners and is separated from the adjacent ovens by the dividing walls 2. Thus it is possible to operate one or more ovens economically while the other ovens may be turned off and not used until desired.

Having described my invention, I claim:

1. A deck oven comprising an outer casing, said casing having a plurality of superposed compartments therein, an oven in each of said compartments, the walls of said oven being spaced from the walls of said compartment, burners in said compartments at the sides of the ovens, and said compartments each having an outlet vent below an oven.

2. A deck oven comprising an outer casing having a plurality of superposed compartments therein, ovens in said compartments, burners in said compartments at the sides of said ovens, and each compartment having an outlet vent adjacent the bottom of an oven, a door closing each compartment, said door having a spaced plate thereon, said plate being adapted to engage and close the front of the oven.

3. A deck oven comprising an outer casing, said casing having a plurality of superposed compartments therein, an oven in each of said compartments, the walls of said oven being spaced from the walls of said compartment, burners in said compartment at the sides of the ovens, and each compartment having an outlet vent below an oven, a door closing each compartment, said door having a spaced plate thereon, said plate being adapted to engage and close the front of the oven.

4. A deck oven comprising an outer casing having a plurality of superposed compartments therein, ovens in said compartments, burners in said compartments at the sides of an oven, and said compartments having an outlet vent adjacent the bottom of said ovens, a heating compartment below the lowest oven, burners in said heating compartment, said heating compartment having an outlet vent therein.

5. A deck oven comprising an outer casing having a plurality of superposed compartments therein, ovens in said compartments, burners in said compartments at the sides of an oven, and said compartments having an outlet vent adjacent the bottom of said ovens, a heating compartment below the lowest oven, burners in said heating compartment, said heating compartment having an outlet vent therein, and a baffle plate in said heating compartment adapted to direct the heated gases against the bottom of the adjacent compartment.

6. A deck oven comprising an outer casing, a plurality of superposed compartments in said casing, an oven in each compartment, the walls of said oven being spaced from the walls of the compartment, burners at either side of the oven, a flue at the rear of said deck oven, each of said compartments having an outlet vent below an oven, extending into said flue.

7. A deck oven comprising an outer casing, a plurality of superposed compartments in said casing, an oven in each compartment, the walls of said oven being spaced from the walls of the compartment, burners at either side of the oven, a flue at the rear of said deck oven, each of said compartments having an outlet vent below an oven, extending into said flue, a heating compartment below the lowest oven, burners in said heating compartment and a baffle plate in said heating compartment adapted to direct the heating gases against the bottom of the adjacent compartment.

8. A deck oven comprising an outer casing, a plurality of superposed compartments in said casing, an oven in each compartment, the walls of said oven being spaced from the walls of the compartment, burners at either side of the oven, a flue at the rear of said deck oven, each of said compartments having an outlet vent below an oven, extending into said flue, a door on each of said compartments, a spaced plate secured to said door, said spaced plate being adapted to engage and close the front of the oven.

In testimony whereof, I affix my signature.

BERNARD C. DE MEULLE.